United States Patent [19]
Gregg

[11] Patent Number: 5,741,465
[45] Date of Patent: Apr. 21, 1998

[54] REACTIVE WASTE DEACTIVATION FACILITY AND METHOD

[75] Inventor: Ronald E. Gregg, Dana Point, Calif.

[73] Assignee: Advanced Environmental Technology, Inc., Dana Point, Calif.

[21] Appl. No.: 699,825

[22] Filed: Aug. 20, 1996

Related U.S. Application Data

[63] Continuation-in-part of Ser. No. 567,757, Dec. 5, 1995.
[51] Int. Cl.⁶ ............................... G21F 9/00; A45C 13/06
[52] U.S. Cl. .................... 422/189; 149/124; 110/237; 588/202
[58] Field of Search ............................. 588/202; 149/124; 110/237; 422/189

[56] References Cited

U.S. PATENT DOCUMENTS

| | | | |
|---|---|---|---|
| 4,320,709 | 3/1982 | Hladun | 110/237 |
| 5,419,862 | 5/1995 | Hampel | 588/202 |
| 5,423,271 | 6/1995 | Schulze | 110/237 |
| 5,495,063 | 2/1996 | Magenheimer et al. | 588/202 |
| 5,527,983 | 6/1996 | Tadmor et al. | 588/202 |

Primary Examiner—Gary P. Straub
Attorney, Agent, or Firm—Walter A. Hackler

[57] ABSTRACT

A reactive waste deactivation facility capable of continuously processing a wide spectrum of hazardous waste includes a building having an outer perimeter defined by a plurality of deactivation bays each including means for deactivating hazardous wastes. One or more expansion chambers are surrounded by the plurality of bays and are commonly connected to an air pollution control system. The deactivation bays are connected with the expansion chamber by means of plurality of expansion ducts each having closable exhaust ports therein such that each inactive deactivation bay may be isolated from the expansion chamber when one active bay is in operation. A computer control system provides for sequencing of operation of said deactivation means in the plurality of bays, as well as among other things, controlling the exhaust ports, to effect continuous processing of hazardous wastes in order to provide a selected output of emission gases to said expansion chamber and air pollution control system.

6 Claims, 5 Drawing Sheets

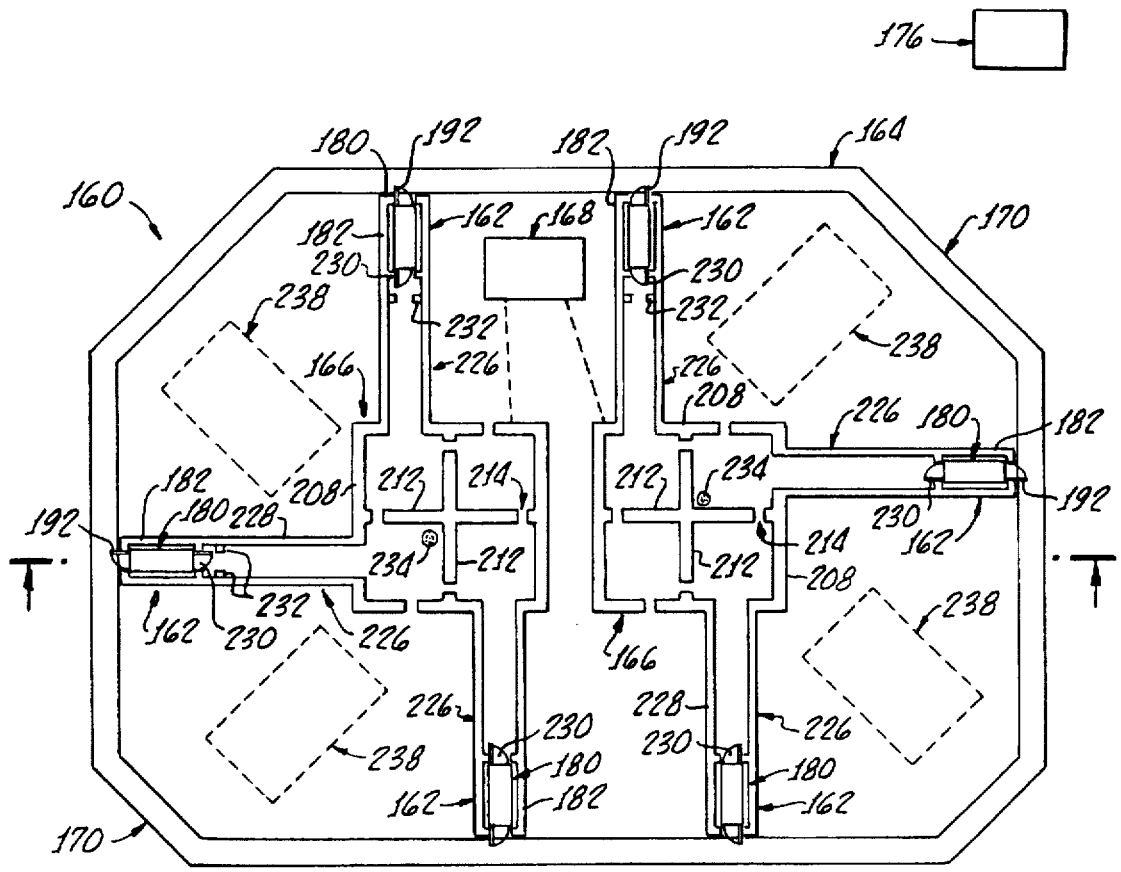
_Fig. 7._
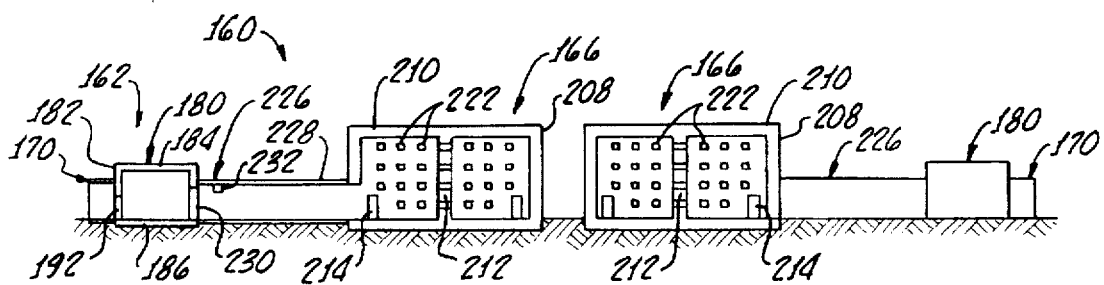
_Fig. 8._

REACTIVE WASTE DEACTIVATION FACILITY AND METHOD

This is a continuation in part of U.S. patent application Ser. No. 08/567,757, filed on Dec. 5, 1995, now pending.

The present invention generally relates to the disposal of hazardous wastes. It is more particularly directed to a deactivation facility and building for receiving a variety of reactive wastes for both government and private generators.

Hazardous waste materials in manufactured items have become increasingly important as public concerns for the environment have become enhanced. Hazardous wastes have accumulated over many years and production thereof has accelerated. In addition, the scope of hazardous wastes has increased due to environmental concerns and public sensitivity to include many materials heretofore considered nonhazardous.

Environmental attitude has resulted in many laws regarding the disposal of hazardous waste and the prevention of disposal of such wastes in conventional manners, such as landfill or open burning. This is particularly true in heavily populated areas. That is, environmental restrictions in addition to expanding population have reduced the number of sites suitable for disposal of hazardous wastes.

Among the reactive wastes which must be treated or processed and are unacceptable as landfill are considered reactive and explosive wastes listed by the United States Environmental Protective Agency under EPA Waste Code D003. Such reactive wastes include explosive contaminated trash, detonators, gas generants, ammunition, tear gas, pyrotechnics, propellants, air bag inflator devices, sigma tubes, emulsions, oxidizers, dynamite, boosters, squibs, grenades, explosive bolts, fuses, igniters, pharmaceuticals, blasting caps, signals, flares, explosive powders, gunpowders, incendiary devices, detonation cord, and explosive sludges, among others.

Such hazardous wastes may be treated in the form of three types. Some specifically hazardous wastes include materials that will burn in an unconfined state without detonating, materials and manufactured items that can be melted or popped with radiant heat, and manufactured items that can be electrically initiated.

Heretofore, apparatus has been developed for handling some of the hereinabove enumerated types of hazardous wastes. Typically, these devices were designed and configured for the incineration of pyrotechnics, explosives, propellants, configured ammunition and the like. This incineration involves the exposure of the hazardous waste to high temperature for extended periods of time in order to oxidize the material, rather than detonate it. Devices of this type are set forth in U.S. Pat. No. 5,207,176.

As set forth in the referenced patent, the incineration of hazardous waste may be accomplished by several methods, but the most common incineration method involves the use of a specially designed rotary kiln.

While such incineration apparatus is satisfactory for the deactivation of hazardous waste that can be melted or popped, it is not suitable for quantities of materials that will burn, resulting in rapid generation of reaction gases. This is true since such rotary kilns do not have the capability of handling the pressure generated through the burning of the hazardous wastes, such as with an expansion chamber or the like.

Further, it should be appreciated that the processes for deactivating burnable hazardous wastes and explodable substances are significant because explosives are generally known as being capable of undergoing quick chemical reaction of decomposition without the intervention of further reactants, especially without atmospheric oxygen. Because oxygen is not required for decomposition of explosives, the process for deactivation thereof has sometimes been referred to as "deflagration" as opposed to combustion which, as is well-known, takes place only with the addition of oxygen. A further explanation of deflagration of explosives is set forth in U.S. Pat. No. 5,423,271, which is incorporated herewith by reference to further distinguish the apparatus necessary for the deactivation of burnable materials and explosive materials.

It should be obvious that none of the processes and apparatus discussed in the hereinabove referenced U.S. patent is suitable for hazardous wastes, such as manufactured items which can be electrically initiated, such as, for example, air bag inflator devices. Presently, there is no facility or method of operating a facility which is capable of handling all types of hazardous wastes, hereinabove noted, on a continuous basis, while at the same time meeting government emission standards. The present invention is directed to such a facility and method.

SUMMARY OF THE INVENTION

A reactive waste deactivation facility, in accordance with the present invention, is capable of continuously processing a wide spectrum of hazardous wastes. This wide spectrum includes the hereinabove enumerated list of hazardous wastes and others falling into the three types of hazardous wastes hereinabove described.

Particularly, the facility contains a plurality of deactivation bays, each including deactivation means, enclosed by a fume collector, for deactivating hazardous wastes. An expansion chamber is provided along with an air pollution control system, and a fume manifold means is provided for interconnecting the fume collectors, the expansion chamber, and the air pollution control system.

A control system provides means for sequencing operation of the deactivation means in the plurality of bays in order to effect continuous processing of hazardous wastes and provide a selected output of emission gases to the expansion chamber and air pollution control system. In this regard, the control means includes a computer which provides means for calculating pollutant emissions from the facility.

More particularly, the deactivation means includes different types of deactivation devices, each type of deactivation device being configured for deactivating a different class of hazardous waste. Further, a number of the plurality of deactivation bays includes a deactivation device of the same type.

Specifically, the facility in accordance with the present invention may include three different types of deactivation devices. More specifically, the three different types of deactivation devices may include pan means for burning non-detonating materials, box means for melting and/or deactivating manufactured items by radiant heat, and deployment means for electrically initiating a manufactured item. In order to accommodate expansion gases, the fume manifold means interconnects the fume collector disposed in the deactivation bays having pan means with the expansion chamber and the air pollution control system, whereas the fume manifold means interconnects the fume collectors disposed in the remainder of plurality of deactivation bays directly with the air pollution control system.

In a specific embodiment of the present invention, the deactivation facility includes a total of twelve deactivation bays with four of the plurality of deactivation bays including pan means, four of the deactivation bays including box means, and four of the deactivation bays including deployment means. Interconnected therewith, as hereinabove described, is the air pollution control system which may comprise a rotary atomizing scrubber and a thermal oxidation unit.

A method, in accordance with the present invention, for the continuous deactivation of a wide spectrum of hazardous wastes includes the steps of separating incoming hazardous wastes into three classes: the first class being materials burnable in an unconfined state without detonation thereof, a second class being materials capable of being melted or detonated with radiant heat, and a third class being manufactured items capable of being electrically initiated.

In accordance with the method of the present invention, an analysis is performed on the materials and manufactured items, in accordance with a waste analysis plan, and an allowable waste feed ratio is determined, the determined waste feed rate being that which can be processed without exceeding a prescribed air emission standard.

Loading of the determined allowable waste feed of each class into a plurality of deactivation bays is thereafter performed, with each bay being suitable for deactivation of one of the three classes of hazardous waste hereinabove set forth.

Importantly, the deactivation bays are sequentially operated in order to provide a selected output of emission gas. This output of emission gas is passed to an air pollution control system for release thereafter to the atmosphere.

In another embodiment of the present invention, the reactive waste deactivation facility comprises a building of which a plurality of deactivation bays, preferably at least six in number, define an outer perimeter thereof. The plurality of deactivation bays are disposed around a plurality of expansion chambers, preferably two in number.

Each of the two expansion chambers service three of the deactivation bays. A common air pollution control system may be interconnected to both of the expansion chambers.

More particularly, three major types of deactivation bays may be utilized in accordance with the present invention. One is a deactivation pan used to burn propellants and explosive contaminated material in a refractory lined pan set in a deactivation bay. Second is an electrically heated deactivation box which melts, detonated, or thermally initiates manufactured explosive items. Third is a detonation chamber which initiates explosive devices and contains the emission products for up to a 10 Kg TNT equivalent detonation. Capacities of the deactivation pans may be up to 1000 pounds or more of class 1.1 explosives, capacities of the electrically heated deactivation boxes are up to 1000 pounds or more of manufactured items. The detonation chamber will accommodate up to about 10 pounds of TNT or more equivalent in explosive weight.

The two expansion chambers provide means for controlling expansion of waste gasses exhausted from the deactivation bays during the deactivation process. In particular, each may comprise a large cement structure or enclosure, generally cubical in shape, having four exterior sidewalls, and two interior bisecting walls. The interior walls provide support for the walls of the expansion chamber and make it possible for the chamber to be constructed sufficiently large to accommodate substantial expansion of waste gasses.

The interior walls of the expansion chamber structure preferably include a plurality of openings therethrough which promote a uniform pressure buildup within the expansion chamber structure. This design prevents possible deformation or weakening of the structure due to sudden and severe pressure changes during the initiation of explosives in a deactivation chamber.

In this embodiment, a plurality of expansion ducts are provided. Each duct has an ingress port at one of the deactivation bays and an egress through one of the four sidewalls of one of the expansion chamber structures. Each expansion duct comprises a generally cylindrical or rectangular cement structure having a diameter sufficient to relieve pressure in the deactivation bay by exhausting the expanded waste gasses into the expansion chamber structure.

A closable exhaust port is provided within each of the expansion ducts. The closable exhaust ports provide means for selectively isolating each deactivation bay from the expansion chamber during deactivation in one of the bays. The exhaust ports may be controlled remotely by means of the computer control system described hereinabove such that only one operating deactivation bay is in communication with the expansion chamber at any one time.

Furthermore, each expansion duct may include means for controlling and reducing pressure of gasses exhausted therethrough. Particularly, liquid spray nozzles may be provided which direct a cooling spray across the hot waste gas stream as the stream passes through the expansion duct. Thereafter, the spent liquid may be cycled to the air pollution control scrubber for cleaning.

BRIEF DESCRIPTION OF THE DRAWINGS

The advantages and features of the present invention will be better understood by the following description when considered in conjunction with the accompanying drawings in which:

FIG. 7 is a diagrammatical plan view of another embodiment of a deactivation facility in accordance with the present invention, generally showing a building comprising six deactivation bays defining an outer perimeter of the building and surrounding two separate expansion chambers, the expansion chambers being in communication with the deactivation bays by means of a plurality of expansion ducts; and FIG. 8 shows a cross sectional view of the building taken along line 8—8 of FIG. 7.

DETAILED DESCRIPTION

Figure 1:
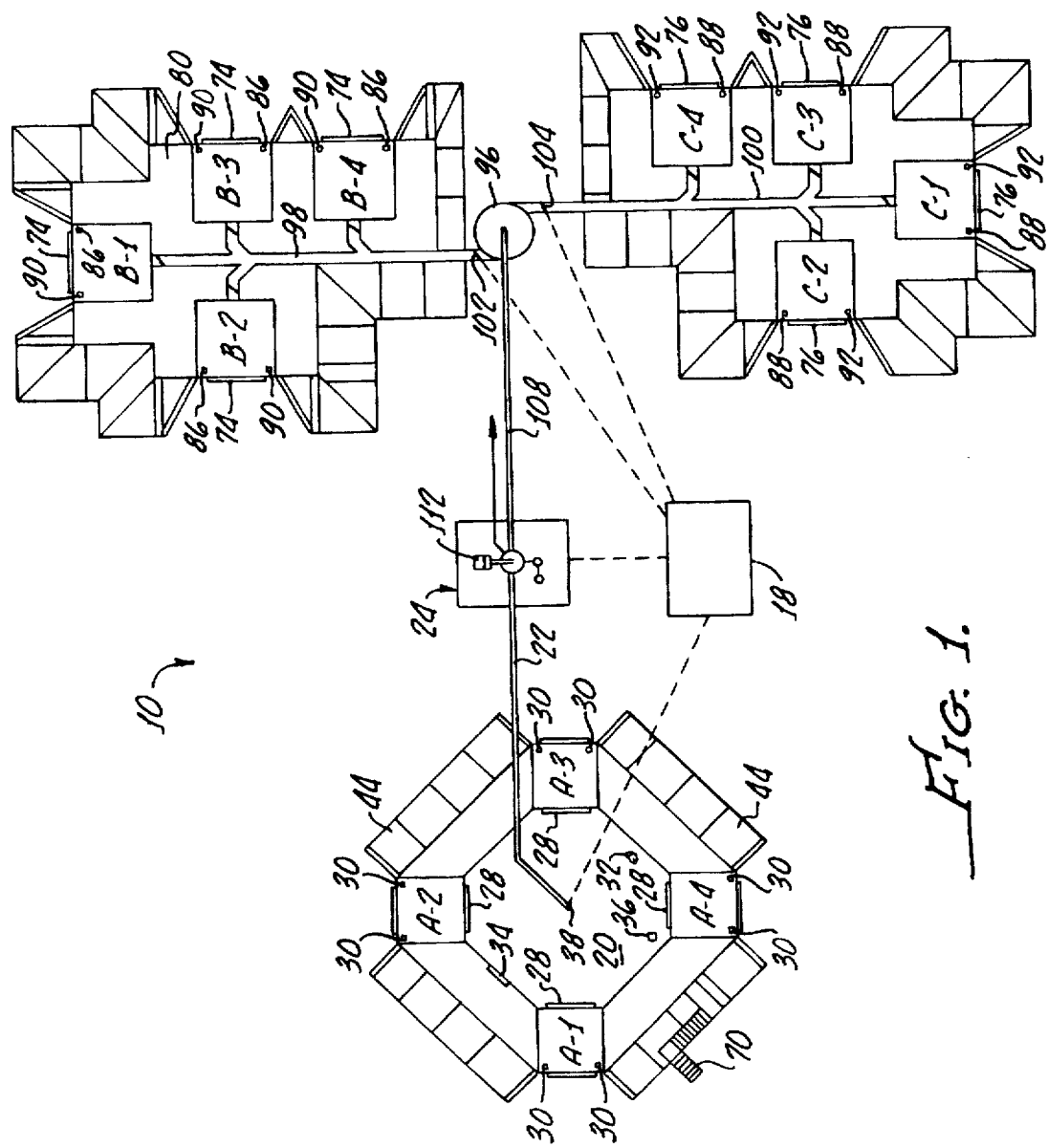
FIG. 1 is a diagram of the reactive waste deactivation facility in accordance with the present invention, generally showing a plurality of deactivation bays, including different types of deactivation devices, with each type of deactivation device being configured to deactivate a different type of hazardous waste.
Figure 5:
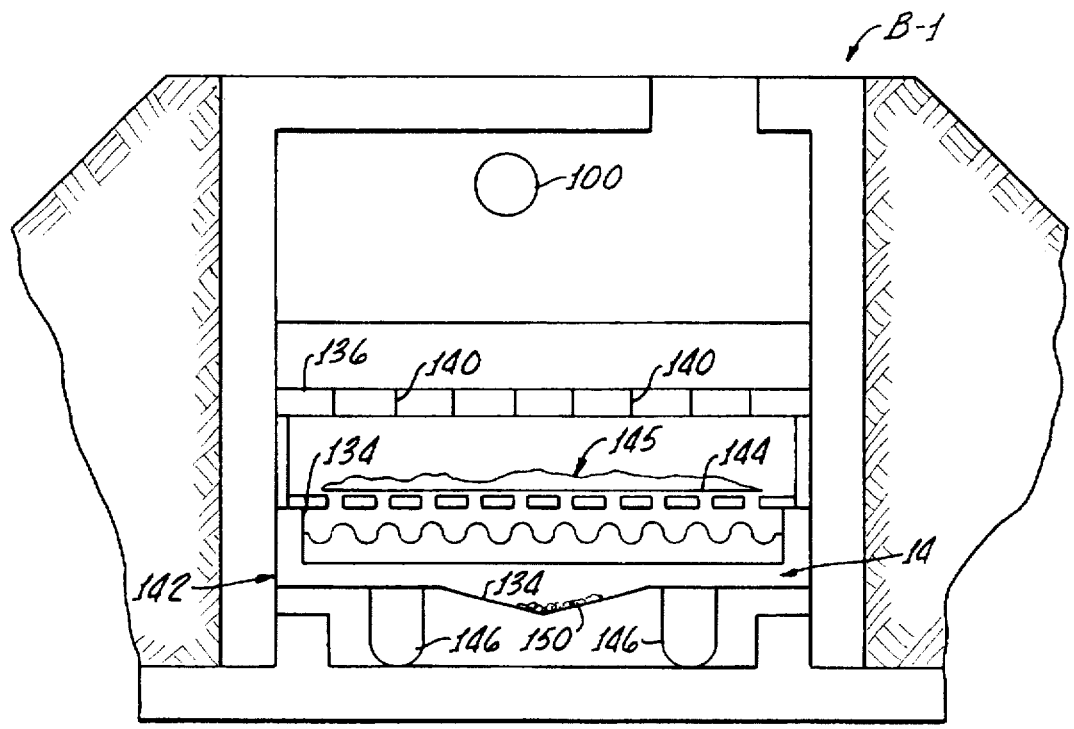
FIG. 5 is a side view of deactivation boxes, in accordance with the present invention, as disposed in deactivation bays.
Figure 6:
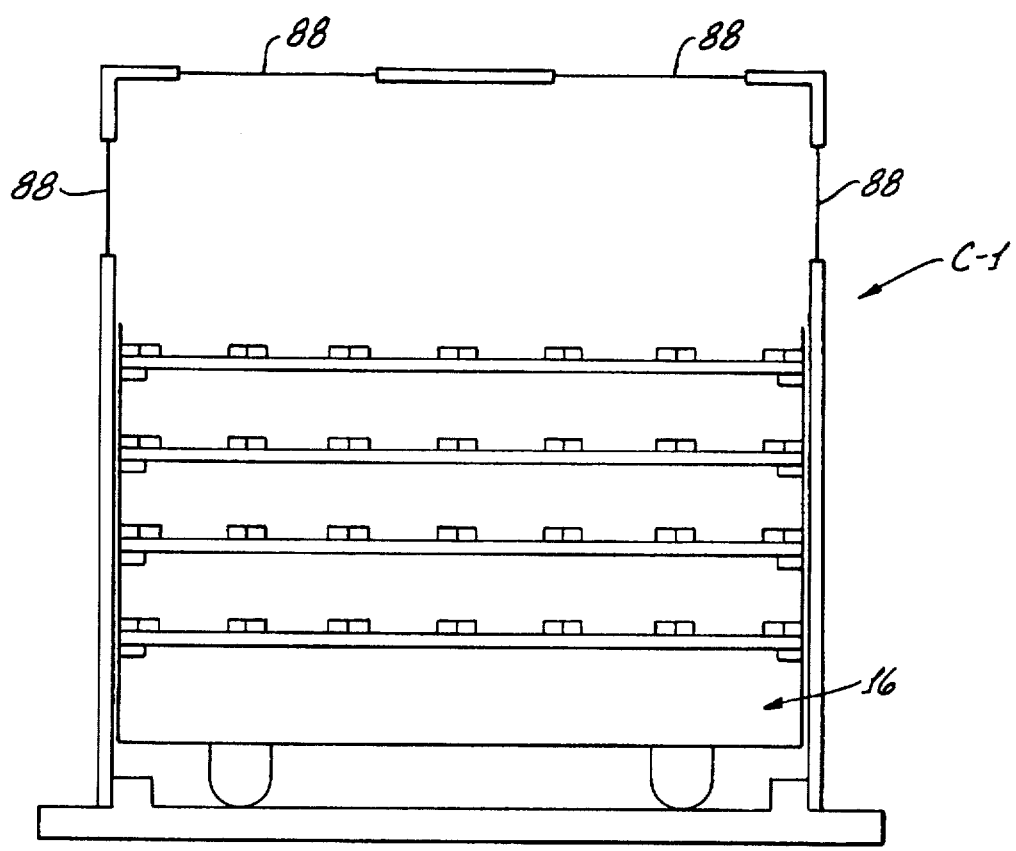
FIG. 6 is a side view of deployment devices configured for deactivating items capable of being electrically initiated.

Turning now to FIG. 1, the reactive waste deactivation facility 10, in accordance with the present invention, for continuously processing a wide spectrum of hazardous wastes generally includes twelve deactivation bays A-1, A-2, A-3, A-4, B-1, B-2, B-3, B-4, C-1, C-2, C-3, and C-4, with bays A-1, A-2, A-3, A-4 being of similar design and disposed for containing deactivation pans 12 (see FIG. 4); deactivation bays B-1, B-2, B-3, B-4, configured for enclosing deactivation boxes 14 (see FIG. 5); and deactivation bays C-1, C-2, C-3, C-4, configured for enclosing deployment devices 16 (see FIG. 6). The sequential operation of the bays A-1 to A-4, B-1 to B-4, C-1 to C-4, and the corresponding pans 12, boxes 14 and devices 16 is preferably controlled by a computer system 18, the operation of which will be described hereinafter in greater detail.

FIG. 1 illustrates the four bays A-1 to A-4 built in to an expansion chamber 20.

As shown in FIG. 1, the expansion chamber is connected via a suction line 22 to an air pollution control system 24 which may comprise a scrubber as will be hereinafter described with greater particularity.

Each of the deactivation bays A-1 to A-4 includes sliding electric gates 28 communicating with the expansion chamber 20, as well as conventional blowout panels 30.

The expansion chamber 20 is itself provided with a pressure vacuum relief valve 32, access door 34, and a blowout panel 36. In addition, a pressure regulator/scrubber access line valve 38 may be disposed in the suction line 22 proximate the expansion chamber 20.

Figure 2:
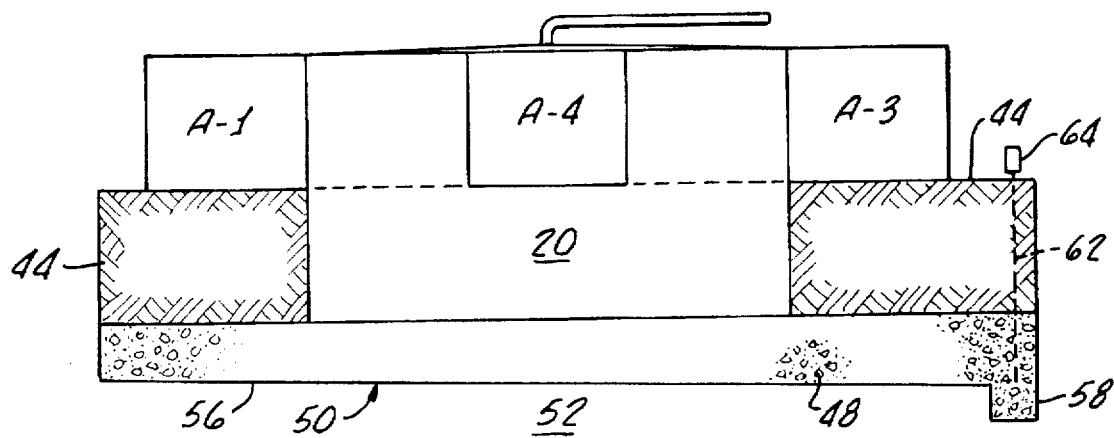
FIG. 2 is a cross-sectional view of deactivation bays suitable for containing deactivation devices, such as pans interconnected with an expansion chamber.

As shown in FIG. 2, a bottom portion 32 of the expansion chamber 20 is made of concrete walls and floor which are underlain by a gravel base and separated by a liner 50 from supporting soil 52. A secondary containment system 56 of gravel 48 is sloped to an accumulation corner 58, and accumulation therein may be removed by a line 62 and pump 64. Overhead access to the expansion chamber 20 and bays A-1 to A-4 may be provided by concrete stairs 70, shown in FIG. 1.

The arrangement of deactivation bays A-1 to A-4, as shown in FIGS. 1 and 2, enables the servicing of four such bays by a single expansion chamber. As will be hereinafter described in greater detail, the bays A-1 to A-4 are used with deactivation pans 12, which are suitable for materials which will burn in an unconfined pan without detonating. However, such deactivation could induce rapid generation of reaction gases, and accordingly such reaction gases are retained without excessive buildup in pressure in the expansion chamber 20.

Other deactivation bays B-1 to B-4 and C-1 to C-4 are designed for deactivating wastes which do not produce large quantities of expanding reaction gases. Accordingly, as will be hereinafter discussed in greater detail, the emissions therefrom are routed directly to the air pollution control system 24.

Figure 3:
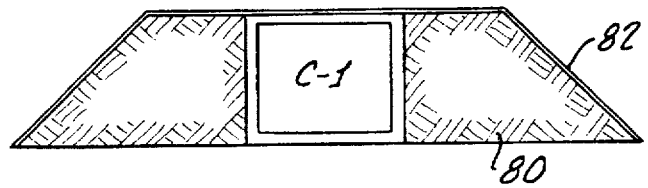
FIG. 3 is a cross-sectional view of deactivation bays suitable for use with box deactivation devices.

Again, as shown in FIG. 1, deactivation bays B-1 to B-4 and C-1 to C-4 are similar in design, with each bay being typically 12 feet square having access doors 74, 76, respectively, and surrounded by berm 80 (as shown in cross-section in FIG. 3), with gunnite 82, or the like, disposed thereon.

As illustrated in FIG. 1, each of the deactivation bays B-1 to B-4 and C-1 to C-4 is provided with blowout panels 86, 88, respectively, and pressure/vacuum relief valves 90, 92, respectively. Each of the bays B-1 to B-4 and C-1 to C-4 is interconnected to a cyclone 96 by ducts 98, 100, respectively, with gas flow therethrough being controlled by dampers 102, 104, respectively, for providing gaseous outflow through a suction line 108 to the air pollution control system 24.

As a result, the deactivation bays B-1 through B-4, containing deactivation boxes 14, and deactivation bays C-1 through C-4, containing deployment devices 16, are vented through the single cyclone 96 to the air pollution control system; and both the expansion chamber 20 and the cyclone 96 are piped by suction lines 22, 108 to the air pollution control system 24 and thereafter vented through a stack 112.

Each bay represents a single batch process which is designed to treat the waste material and to vent the emissions through the scrubber 24 in a one-hour time period, as hereinafter described in greater detail. While one bay operates, the other eleven are closed off by the valves 38 and dampers 102, 104. Waste is loaded into all twelve bays at the start of an operation, and a twelve-hour period follows in which all twelve bays are operated. Residuals from each bay are manually unloaded, and the bays are reloaded with waste.

A second twelve-hour operation is then initiated, giving two shifts per day, with a total of twenty-four bays treated per day. Further operational sequencing will be described after the following description of the deactivation pans 12, deactivation boxes 14 and deployment devices 16.

Figure 4:
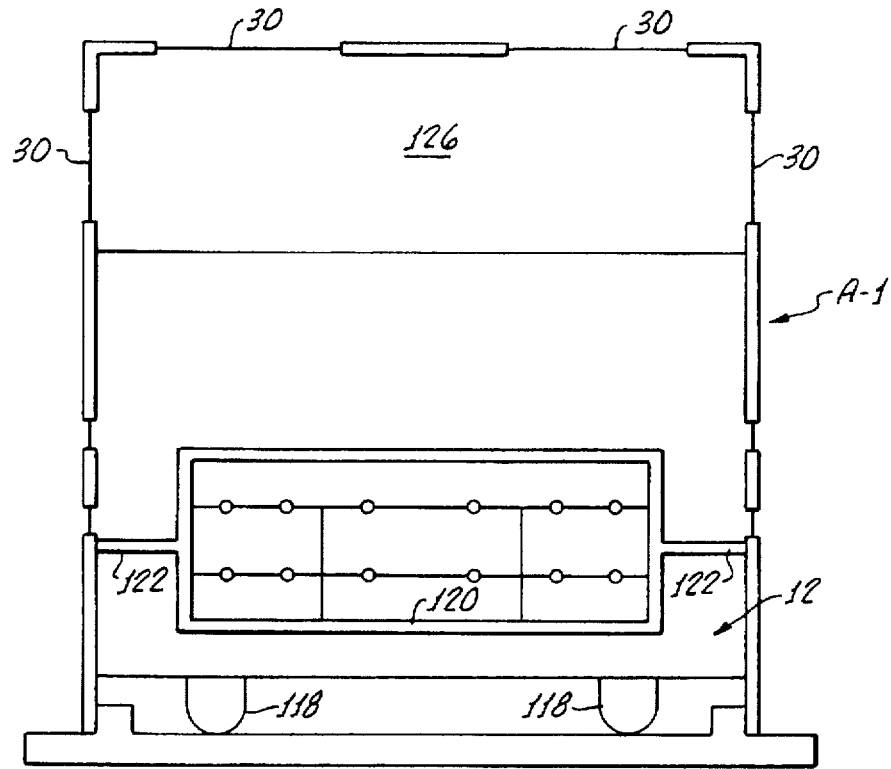
FIG. 4 is a side view of a deactivation pan, in accordance with the present invention, as disposed in a deactivation bay.

As shown in FIG. 4, the deactivation bay A-1 is sized for containing the deactivation pan 12, which is utilized to deactivate nondetonating propellants, pyrotechnics and explosives. Additionally, wastes associated with the manufacture, use and distribution of these materials will also be deactivated in the pans 12.

In general, the deactivation pan 12 is a metal pan on roller wheels 118. The pans may be constructed of heavy steel with a continuous refractive liner 120. The pan 12 may have lips 122 to maintain bulk material in the pan, with the lips being constructed of steel and coated with refractory liner. The pan 12 is moved under a hood 126, disposed within the deactivation bay A-1, which communicates with the expansion chamber 20 as hereinabove described.

The back and both sides of the hood 126 extend downward to the ground over the pan and once the loaded pan 12 is rolled into place, the gate 28 is secured. The expansion chamber 20 is sized to maintain new reaction gases from a 2,000 lb. batch of propellant under pressure. The expansion chamber 20 will fill with reaction gases during rapid expansion in the deactivation pan. After the rapid reaction declines, the scrubber access line valve 38 will open and all gases will be treated in the scrubber 24 within a fixed interval from initiation of the reaction. A predetermined amount of waste is laid out in a layer of typically 1–2 inches with the thickness of the layer and the total pounds of weight depending upon the nature of the material and upon safety criteria for the particular waste.

Table 1 shows typical reactive wastes which can be treated in the deactivation pans 12.

TABLE 1

| MATERIAL NAME | WASTE DENSITY LBS/IN$^3$ | WASTE LBS/PAN[1] 2" LAYER | LBS/YEAR[2] |
|---|---|---|---|
| Ammonium Nitrate | 0.062 | 1785.6 | 4,285,440 |
| Ammonium Perchlorate | 0.070 | 2016 | 5,054,400 |
| Baratol | 0.117 | 3366 | 8,078,400 |
| Dynamite | 0.057 | 1642 | 3,940,800 |
| Flash Powder | 0.091 | 2620 | 6,288,000 |
| PETN | 0.064 | 1842 | 4,420,800 |
| RDX | 0.060 | 1814 | 4,353,600 |
| UDMH | 0.020 | 576 | 1,382,400 |

[1] 10' × 10' pan, 2 inches deep, 28,800 cubic inches
[2] 8 pans per day; 300 days per year The loaded pans 12 are rolled under the hood by the forklift (not shown). After rolling into place, the front flap of the hood is lowered and the unit is ready for initiation. All personnel will then leave the bay area and the system will be started. The deactivation will be started using remote controlled initiation sequence.

Upon completion of the 1-hour treatment sequence, the pan 12 will be allowed to cool down. After complete cooling, as indicated by the control room temperature gauge (not shown), the hood door will be opened and the pan 12 rolled out. The yard crew will manually remove debris from the pan 16, placing it into drums or bins, as appropriate, depending on the constituent concentrations and the applicability of recycling regulations.

The pan and hood system will then be ready for the next batch of waste and the next treatment cycle. Each treatment cycle, including loading, initiation, deactivation, cool down, and removal will last 12 hours.

At full production for the facility, with 4 bays containing deactivation pans 12, each pan 12 would be initiated twice per day, totaling 8 runs per day. Spacing the initiation cycles at 1-hour intervals assures that each bay can operate twice per 24-hour period, that the system gas volume and temperature limits are not exceeded, and that al fumes are passed through the air pollution control system 24.

Because the deactivation rates of different wastes vary, the rate at which the initiation volume of gas is produced will vary. In some cases, rapid deactivation will occur, especially in those wastes which have a high internal oxygen content, and the gas generation rate will be rapid at initiation. For this reason, the expansion chamber 20 is preferred in the pollution control system to contain these gases.

When reactive wastes go through rapid ignition, the generated gas will expand into the chamber 20. The gas will then be carried through the fume piping 22 to the scrubber 24. For the purpose of all air pollution emission calculations, each treatment sequence, approximately one hour is required for the emissions to pass from the unit, through the expansion chamber 20, the air pollution control system 24, and out the stack 12. The emission concentrations are assumed to be linear over the one-hour period and reach insignificant levels at the end of one hour.

An example operational sequence for the entire deactivation facility is shown in Table 2. Each deactivation pan 12 will be initiated and will complete two treatment sequences per 24-hour day. Thus, each sequence will extend over 12 hours. Table 2 shows the event sequence from the wait mode through loading, initiation, cool down, removal, unloading and back to the wait mode. The time required for each event in the sequence is shown and the position for the vents is indicated. Air flow rates in ACFM and relative rate of air flow are indicated.

During actual operation, the scrubber air pollution control system 24 will operate continuously. The air pollution control system 24 will be on at all times, and during any given 60-minute sequence, one deactivation pan will be operating at maximum, and the others will be closed off.

TABLE 2

| OPERA-TIONAL EVENT | OPERA-TIONAL SYMBOL | TIME IN MINUTES | PAN VENT[1] POSITION | ACFM[2] (MAXIMUM) |
|---|---|---|---|---|
| Waiting | W | 60 | Closed | 0 |
| Pan Loading | L | 60 | Closed | 0 |
| Initiation | I | 60 | Open | 1000 |
| Cool Down | CD | 60 | Closed | 0 |
| Cool Down | CD | 60 | Closed | 0 |
| Cool Down | CD | 60 | Closed | 0 |
| Cool Down | CD | 60 | Closed | 0 |
| Cool Down | CD | 60 | Closed | 0 |
| Cool Down | CD | 60 | Closed | 0 |
| Pan Unloading | UL | 60 | Closed | 0 |
| Waiting | W | 60 | Closed | 0 |

[1] Vents are automatically controlled. Air flow regime will depend on specific waste characteristics.
[2] The Actual Cubic Feet per Minute (ACFM) of air is for the one operating bay only.
NOTE: During any 60-minute sequence, in a 24-hour day, 1 bay is in the ignition event, the other 11 are off.

The purpose of this staggered operating sequence is to level out the flow of emission gases from the bays, the expansion chamber 20 and the cyclone 96 to allow the air pollution control system 24 a constant gas flow for treatment. Table 3 summarizes an example of bay operation sequence for 12 bays over a 24-hour period. Each bay goes through L (load), I (initiation, CD (cool down), UL (unload), End W (waiting) phases twice per day on a 12-hour cycle. Note that for any given hour of the day, only one pan is initiating and undergoing the maximum gas evolution phase.

This prevents the expansion chamber 20 and the air pollution control system 24 from overloading. Each initiation and treatment sequence covers approximately one hour of the twelve-hour cycle for an individual bay.

Each bay has control system features which will operate to control air and fume movement. Each bay has vents (if needed) which control the amount of air supplied to the deactivation zone, and each bay has an initiation device to begin the treatment sequence. All control system features are computer controlled.

The deactivation bay system was specifically designed to protect operating personnel. During a loading sequence, all twelve bays are loaded with reactive wastes. The pans 12, boxes 14, and devices 16 are loaded, based upon selected waste streams and specifications and the continuing refinements developed during testing and operations of the facility 10.

TABLE 3

| 24-HOUR CLOCK | 1 | 2 | 3 | 4 | 5 | 6 | 7 | 8 | 9 | 10 | 11 | 12 |
|---|---|---|---|---|---|---|---|---|---|---|---|---|
| 1 | L | UL | CD | CD | CD | CD | I | W | W | CD | CD | CD |
| 2 | W | L | UL | CD | CD | CD | CD | I | W | CD | CD | CD |
| 3 | W | W | L | CD | CD | CD | CD | CD | I | CD | CD | CD |
| 4 | I | W | W | CD | CD | CD | CD | CD | CD | L | UL | CD |
| 5 | CD | I | W | CD | CD | CD | CD | CD | CD | W | L | UL |
| 6 | CD | CD | I | UL | CD | CD | CD | CD | CD | W | W | L |
| 7 | CD | CD | CD | L | UL | CD | CD | CD | CD | W | W | W |
| 8 | CD | CD | CD | W | L | UL | CD | CD | CD | I | I | W |
| 9 | CD | CD | CD | W | W | L | UL | CD | CD | CD | CD | I |
| 10 | CD | CD | CD | I | W | W | L | UL | CD | CD | CD | CD |
| 11 | CD | CD | CD | CD | I | W | W | L | UL | CD | CD | CD |
| 12 | UL | CD | CD | CD | CD | I | W | W | L | CD | CD | CD |
| 13 | L | UL | CD | CD | CD | CD | I | W | W | CD | CD | CD |
| 14 | W | L | UL | CD | CD | CD | CD | I | W | CD | CD | CD |
| 15 | W | W | L | CD | CD | CD | CD | CD | I | UL | CD | CD |
| 16 | I | W | W | CD | CD | CD | CD | CD | CD | L | UL | CD |

TABLE 3-continued

| 24-HOUR CLOCK | 1 | 2 | 3 | 4 | 5 | 6 | 7 | 8 | 9 | 10 | 11 | 12 |
|---|---|---|---|---|---|---|---|---|---|---|---|---|
| 17 | CD | I | W | CD | CD | CD | CD | CD | CD | W | L | UL |
| 18 | CD | CD | I | UL | CD | CD | CD | CD | CD | W | W | L |
| 19 | CD | CD | CD | L | UL | CD | CD | CD | CD | I | W | W |
| 20 | CD | CD | CD | W | L | UL | CD | CD | CD | CD | I | W |
| 21 | CD | CD | CD | W | W | L | UL | CD | CD | CD | CD | I |
| 22 | CD | CD | CD | I | W | W | L | UL | CD | CD | CD | CD |
| 23 | CD | CD | CD | CD | I | W | W | L | UL | CD | CD | CD |
| 24 | UL | CD | CD | CD | CD | I | W | W | L | CD | CD | CD |

L-Load
I-Initiation
CD-Cool Down
UL-Unload
W-Waiting

Turning now to FIG. 5, a deactivation box 14 is shown in a bay B-1. The deactivation boxes 14 will be used for ammunition and related items of which deactivation occurs through "popping" of each individual item. The deactivation box 14 utilizes a very thick steel wall pan 134 and cover 136, which are able to withstand the popping of the ammunition.

During treatment, the steel walls of the unit form a continuous shield, preventing any projectiles from leaving the pan 134. All gases formed during the deactivation process pass through vent holes 140 in the top steel shield into the collection hood for conveyance by the fume duct to the cyclone and into the air pollution control system 24. The boxes 14 are similar to the deactivation pans 12, except the steel boxes 14 do not have any refractory lining.

The deactivation boxes 14 have a popping tray 142 on the bottom and an upper shielded hood component 136. The popping tray 142 may be a 10-foot square tray with an elevated grate 144 where the waste 145 sits while the tray 142 rolls on wheels 146 under the fume hood in the same manner as the deactivation pans 12.

Shielded walls of the pan 134 and cover 136 consist of 3" thick alloy steel and withstand the impact of popping ammunition. The pan 134 is heated electrically to melt the lead in the ammunition 145 and to cause the reactive material in the ammunition 145 to deactivate. Operating temperatures in the box 14 range from 400°–750° F. The box heating system is designed to evenly distribute the heating energy. Each deactivation box 14 sequence is designed to operate for one hour. All reactive material within the box will be treated within the one-hour interval. Melted lead 150 will flow through the grate 144 into a lead recovery portion 152 of the tray 134 for collection and recycling. The device is moved back and forth under the hood by a forklift (not shown) during loading and unloading.

A deactivation sequence begins with the tray in front of the hood sitting empty on the concrete bay floor. The transport truck (not shown) arrives with sufficient volume of reactive items for the run. The cars are hand loaded with the items being placed two inches deep on the tray. Once the tray is loaded, the forklift moves it under the shielded hood. The ignition cables are attached to the cart, personnel vacate the area, the vent control is activated, and the deactivation sequence is started from the control center.

During the sequence, the projectiles melt out or are popped out when the ammunition functions. The reactive chemical mixture in the shell casing deactivates producing gaseous emissions, which are drawn upward through the hood into the expansion chamber and then into the air pollution control system 24. The lead 150 from the projectiles melts and flows into the lead recovery pan 152, leaving the brass shell casings and other metal parts on the elevated grate 144.

The time required to deactivate the reactive material is one hour per sequence. Upon completion of the ignition, the pans and metal parts are allowed to cool down to ambient temperature. The forklift rolls the carts out and the metal parts or debris are manually removed and placed into containers. The spent casings will be accumulated in drums or bins while being moved through the temporary storage into the storage yard. From the storage yard, the items can be sold to scrap metal vendors.

The rate that various waste items may be loaded into the pans has been calculated. Example items and the load rates have been calculated and are shown in Table 4. The type of cartridge, the weight of each item, the number of items per pound, and the total number of cartridges while will fill the cart and comprise a 654-pound load are shown in Table 4.

TABLE 4

CARTRIDGE WEIGHTS AND NUMBERS PER BAY

| | WT. OZ. | NO. PER LB. | NO. PER 654-LB. LOAD |
|---|---|---|---|
| Fuze, PDm557 | 33.88 | .47 | 307 |
| 20 mm | 9.14 | 1.75 | 1144 |
| .30 Caliber | .93 | 17.2 | 11249 |
| .38 Caliber | .45 | 35.6 | 23282 |
| .45 Caliber | .76 | 21.1 | 13799 |
| .50 Caliber | 3.93 | 4.1 | 2681 |

Cartridges consist of a primer and a propellant. The primer is activated by the firing pin of a weapon, which subsequently ignites the propellant. The burning of the propellant fires the projectile. The projectile is made of lead and/or brass. Projectiles may have tracer elements attached to the base. Some projectiles have a high explosive charge in the projectile body and utilize a fuze with booster at the front end to initiate the projectile upon impact.

The reactive component of each munitions or cartridge will deactivate upon ignition in the deactivation box. The reactive chemical compound will create emissions which will be completely captured and controlled.

The emissions from each one-hour treatment sequence occur during the same one-hour period. Emissions exit from the deactivation boxes into the cyclone beginning at the initiation time and continuing during the one-hour treatment interval. During the one-hour interval, a fan draws the emissions from the pan through the cyclone and into the air pollution control system. At the end of the one hour, the unit shuts off automatically and no further emissions are released from the air pollution control system. Emissions from a single pan are linear over the one-hour sequence. The effect of putting all the emissions through the cyclone and drawing them out at a linear rate makes the emission rate to the stack uniform. Further the cyclone is effecting in removing particulates. Four deactivation boxes 14 treating reactive waste initiated sequentially require four hours total to complete four batch treatments.

An example of typical batch treatment is as follows:

Table 5 gives the reactive component breakdown for 0.38 caliber ammunition containing a K-075 primer and a single-base propellant. The weight in grains for each reactive compound is shown. This weight is then multiplied by the number of items to be processed in each deactivation run. This gives the total weight in grains of reactive material treated in each run.

TABLE 5

REACTIVE COMPONENT OF .38 CALIBER AMMUNITION PER ITEM AND PER BOX LOAD

| COMPONENT | COMPOUND WT. | GRAINS (GRAINS) | GRAINS PER 654 LB. LOAD[1] | GRAMS PER LOAD |
|---|---|---|---|---|
| Primer K-75 | | 0.38 | 8847.16 | 73.30 |
| Lead Styphnate | 40.0% | 0.152 | 3538.86 | 29.32 |
| Tetracene | 5.0% | 0.019 | 442.36 | 28.64 |
| Barium Nitrate | 45.0% | 0.171 | 3981.22 | 57.98 |
| Antimony Sulfide | 10.0% | 0.038 | 884.72 | 57.33 |
| Propellant Single Base | | 4.800 | 111754.00 | 41.66 |
| Nitrocellulose | 98.3% | 4.718 | 109844.07 | 17.89 |
| Diphenylamine | 0.7% | 0.034 | 791.58 | 51.26 |
| Potassium Sulfate | 1.0% | 0.048 | 1117.54 | 72.42 |

[1]A load contains 23,282 bullets--654 pounds total weight.

Turning now to FIG. 6, there is shown the deployment device 16 suitable for electrically initiating manufactured items. Manufactured items to be treated in the deployment devices are those items which contains some type of propellant or explosive and which be detonated, or initiated using an electrical current, and are assembled by a manufacturer. These manufactured items are hazardous due to their explosive characteristics and may be regulated as hazaradous waste upon their disposal. For example, the new industry which manufactures air bag safety devices for automobiles produces significant amounts of D003 reactive wastes. This industry is developing in the United States and increasing amounts of reactive waste are being generated at the points where this waste is manufactured. The sources of this waste are chemical plants, where the raw materials are made into propellants, and the manufacturing and assembly plants, where the components are assembled into the air bag devices.

The materials will be deactivated, as required by the Best Demonstrated Available Technology (BDAT) standards for of the United States Environmental Protection Agency for D003 reactive waste. The deployment devices to be utilized have been designed especially for this waste type. All emissions from each deactivation batch treatment will be processed in the air pollution control system.

Typically, an inflator device is four inches in diameter, two inches thick and weighs 1.75 pounds. These inflator devices are attached with other hardware and the air bag into the steering column of an automobile. Each inflator has components which are reactive waste upon disposal. These are the cap, the booster cap, and the gas discs. A detailed breakdown of a typical inflator device is given in Table 6.

TABLE 6

TYPICAL COMPONENTS OF AN AIR BAG INFLATOR WITH THE WEIGHT OF METAL PARTS AND REACTIVE COMPONENTS

| ITEM DESCRIPTION | WEIGHT IN GRAMS | | |
|---|---|---|---|
| | TOTAL WEIGHT | REACTIVE WEIGHT | PARTS WEIGHT |
| Inflator | 795.00 | 91.638[1] | 679.00 |
| Canister | 111.00 | 90.00[2] | 20.00 |
| Can | 41.85 | 0.14[3] | 41.71 |
| Booster | 1.99 | 1.498[4] | 0.499 |

[1]Total reactive material.
[2]Propellant reactive weight.
[3]Cap reactive weight.
[4]Booster reactive weight.

The air bag wastes to be received at the facility will include the following items:

Off-specification inflators (entire inflator unit)
Off-specification canisters (the aluminum can holding the propellant)
Off-specification boosters (small plastic cap holding powder)
Off-specification caps (containing a small amount of reactive material)
Fuel and oxidizer propellant mixture as a waste
Related wastes from the air bag parts The deployment devices 16 are designed to treat a variety of inflators made by various manufacturers. Inflators made for the driver's side air bag and the passenger side air bag vary in size and shape from manufacturer to manufacturer. The deployment devices will accommodate all types of inflators.

As an example, each deployment device 16 may hold 128 inflators per rack, will hold four racks, and thus will treat 512 inflators per run. Four deployment devices at the facility will conduct two runs per day for 300 days per year. This provides the treatment capacity for 1,228,800 complete inflator units per year. Other configurations are also contemplated under the present invention.

Still referring to FIG. 6, there is shown a deployment device 16 in accordance with the present invention. These devices 16 may be 10 feet wide by 10 feet deep and will slide into an enclosure while sitting on the concrete floor of the bays C-1 through C-4. The front doors of the enclosure will open outward to the front. The enclosed bays C-1 through C-4 may be concrete sided structures with blowout panels 88 connected to the fume duct into the cyclone. Deployment devices 16 loaded with inflators are placed by a forklift (not shown) into each enclosure.

Each tray in the device 16 will be hand loaded with 128 inflators. Built onto each tray will be a set of metal conductive clips (not shown) where the initiation wires from each inflator (not shown) will be manually clipped. After a tray is manually loaded and all inflators clipped in, the forklift will lift the deployment device 16 into the deployment device enclosure. Four identical devices will be prepared and loaded into the treatment unit for each deactivation sequence.

Deactivation cables from the central initiation system will attach to each tray. The electric control system in a distribution control center (not shown) will automatically control the deactivation sequence.

Upon completion of a deactivation sequence, the enclosure doors will be opened, the deactivation cables will be disconnected, and a forklift will remove the tray and set it on the concrete pad. After allowing the inflators to cool adequately, they will be unclipped and placed into containers.

Spent inflators will be placed into large bins and disposed in the debris bin area or the storage yard, where it will be purchased by scrap metal dealers, who will pick up the bins and recycle the scrap metal. It will not be treated as hazardous waste.

Table 7 provides a comparison of the produced ds produced during the use of the deactivation pans 12, the deactivation boxes 14, and the deployment devices 16. The volume of gas generated during each deactivation run is shown in the first column and the gas flow rate in ACFM is shown in the second column. These data demonstrate that the produced gas volume from the deactivation of all the waste types is far less than the volume of air the hoods, fume ducts, cyclone, expansion chamber, and air pollution control system handle during normal operation.

Heat produced during operation of the three types of deactivation units is greatest from the deactivation pans and much lower for the deactivation boxes and deployment devices. Because the operations are sequenced at hourly intervals, the heat carried into the cyclone 96, expansion chamber 20 and air pollution control system 24 will not exceed the 16,000,000 btu/hour design capacity. The system will operate well below this capacity. The expansion chamber 20 will be built of a concrete and steel structure and lined with a temperature-resistant lining material.

TABLE 7

COMPARISON OF GAS VOLUMES PRODUCED
DURING REACTION IN THE DEACT PANS,
DEACT BOXES AND DEPLOYMENT DEVICES

|  | VOLUME OF GAS PRODUCED PER LOAD IN CUBIC FEET AT STP | IN ACTUAL CUBIC FEET PER MINUTE |
|---|---|---|
| DEACT PANS | | |
| Ammonium Nitrate | 33,704 | 562 |
| Ammonium Perchlorate | 26,227 | 437 |
| Baratol | 15,351 | 256 |
| Dynamite | 24,445 | 407 |
| Flash Powder | 2,697 | 45 |
| RDX | 24,381 | 406 |
| PETN | 26,028 | 434 |
| DEACT BOXES | | |
| .38 Caliber Ammunition | 1,137 | 19 |
| DEPLOYMENT DEVICE | | |
| Air Bag Inflators | 2,868–14,338 | 48–239 |

Each of the three treatment devices is designed to treat a maximum weight of reactive wastes per batch. The maximum weights per batch for the deactivation pans, deactivation boxes, and deployment devices is 2,000 lbs. each.

The type of waste material treated and quantity will be limited in specific cases for the following two reasons:

Material would exceed air pollution standards.

Material would exceed treatment device safety standards.

Three types of treatment devices may be used to treat three types of waste materials, as summarized below:

Deact Pans: Materials that will burn in an unconfined pan attached to the expansion chamber without detonating.

Deact Boxes: Manufactured items that can be melted or popped with radiant heat in a deact box.

Deployment Devices: Manufactured items that can be electrically initiated using a wiring connection and an automatic initiating device in a deployment device.

Each of these units will have a maximum feed limitation, as stated above, of 2,000 pounds and will have additional limitation based on the nature of the reactive wastes to be treated.

LIMITATIONS
DEACTIVATION PANS

No waste materials that undergo detonation in an unconfined space will be placed in the deact pans. Materials subject to deflagration only will be treated in deact pans.
DEACTIVATION BOXES No waste materials that will propagate detonations will be treated in the deactivation boxes. Individual item detonations shall not exceed a detonation substantial enough to damage the structural integrity of the deact box.

DEPLOYMENT DEVICES

Only waste materials that are detonated via an electric current, direct wired to each item, shall be treated in the deployment device. Individual item ignitions shall not damage the structural integrity of the deployment device.

The air pollution control system 24 is preferably a low pressure drop, but high energy, wet scrubber, such as a Rotary Atomizer Scrubber. The benefits of wet scrubbing include high removal of acid gases particulates, heavy metals, and organics. The rotary atomizing scrubber is able to provide submicron particulate removal with a low gas-side pressure drop. The rotary atomizing scrubber provides a high energy, wet scrubbing device which has baghouse equivalent particulate removal efficiency, with a low pressure drop of 4 inches of water for the entire system. Unlike a baghouse system, however, the rotary atomizing scrubber cannot plug up or burn down, and loss of capacity due to gas side back pressure does not occur. This advanced wet scrubbing equipment will be used to reduce emissions from the facility to less than 0.015 gr/DSCF (corrected to 12% $CO_2$).

The rotary atomizing scrubber 24 creates a constantly renewed high velocity water curtain made up of pre-atomized high energy water droplets. The water pressure necessary to produce an equivalent droplet velocity is 5,000 psi. The water curtain is generated using a high-speed rotating disc, as in a spray dryer. Unlike a spray dryer, the water droplets travel only a short distance before they hit the surrounding cylindrical duct, thereby creating a dense liquid curtain, equivalent to a filter pad.

Particulates passing through this dense spray curtain of atomized droplets are removed by impaction, while gases are collected by absorption. The rotary atomizing scrubber 24 is independent of variations in the gas flow, is transparent and forgiving to the deactivation process. Further the air pollution control system may also incorporate a thermal oxidation system as hereinabove noted.

To calculate the air emissions resulting from the deactivation treatment of reactive wastes and to develop design data for the facility, the Pollu-10, a computer model, may be utilized in the system 18. This model has been widely used to calculate pollutant emissions produced by explosives, propellants, and pyrotechnics and is available from the Naval Surface Weapons Station in Indian Head, Md. The model data were utilized to calculate metal, chloride, particulate, organic and criteria pollutant emissions.

Additionally, the Pollu-10 Model was used to provide physical data on heats of reaction, gas production, flame temperature and products of reaction which were utilized in the system design. The following reviews the use of the Pollu-10 Model and provides technical information on the manner in which the model works.

Deactivation emissions data are given in a document entitled *Computer Predictions of Pollution Products from Open Burning and Open Detonation of Explosives and Propellants* (U.S. Navy, 1989). The document provides emissions data calculated by the Pollu-10 computer program described in the following paragraph. This model has been used in calculating emissions from deactivation using the facility 10.

The computer system 18 program calculates the pollution combustion products during burning when the material and air are mixed together.

This program is a modification of the Propellant Evaluation Program (PEP) written at the Naval Weapons Center, China Lake, Calif. and designed and written by the collaboration of many contributors (Cruise 1979). The pollution computer program uses many of PEP's routines. Modifications were made to calculate pollution products under the special conditions encountered in the treatment of explosives and propellants. These modifications are described under the general description of the pollution computer program. (U.S. Navy, 1989)

The necessary thermodynamic data for the material's ingredients and air, the weight ratios of material to air, and the two pressure values of 1000 and 14.7 psi are read into the computer as input data. The flame temperature, combustion products, moles of gas, entropy, and other pertinent data are calculated for the material/air mixtures under a pressure of 1000 psi.

The volumes of the combustion products are then expanded to 14.7 psi which cause a temperature drop in the products. At this lower temperature, the products have a different composition from that at 1000 psi. The computer recalculates the combustion products, flame temperature and other variables that changed because of expansion. The products calculated at 14.7 psi are reported as the pollution products in the output data. (U.S. Navy, 1989)

Even though the calculations are conducted at 1000 and 14.7 psi, the material does not have to be disposed of under these conditions to predict the pollution products. The calculations are conducted in this manner for the following reasons:

(1) It simulates the drop in temperature as the gases cool to ambient conditions.

(2) The combustion products "freeze" in composition before they reach ambient temperature.

(3) The combustion products of explosives and propellants formed in the combustion calorimeter are in good agreement with the products calculated by the computer (Baroody 1987).

(4) The heats of explosion calculated from the PEP computer program closely approximate the actual values determined from calorimetric data (Baroody 1987). (U.S. Navy, 1989)

SIMULATING A DROP IN TEMPERATURE

Initially, temperatures above 3500 K (5840° F.) can be reached by some materials. The temperature then cools to the ambient temperature of the surroundings. It is important to account for this drop in temperature because the composition of the combustion products for the initial high temperature will be different from the composition cooled to ambient temperature.

In effect, the temperature change can be simulated by calculating the temperature of the material under a pressure of 1000 psi and after the combustion products have expanded to 14.7 psi. (U.S. Navy, 1989)

FROZEN COMBUSTION PRODUCTS

The composition of the combustion products will continually change with temperature until a "freeze" temperature is reached. Afterwards, the composition of the products remain constant, both quantitatively and qualitatively, even though they continue to cool to ambient temperature. The products are said to freeze when they no longer change with temperature. This freeze temperature is unknown and varies with each material burned. In his detonation calorimetric work, Ornellas reported that the freeze temperature is between 1500 to 1800 K for most explosives (Ornellas 1982). The freeze temperature for the combustion products in this study is assumed to be the temperature that is calculated when the products are expanded to 14.7 psi. For most of the explosives and propellants this computer program calculates this temperature to be in the range of 1200 to 1500 K. (U.S. Navy, 1989)

CALCULATED VERSUS DETERMINED COMBUSTION PRODUCTS

In our laboratory approximately a dozen explosives and propellants have been burned in a combustion calorimeter under an atmosphere of 450 psi of helium. The combustion products analyzed were in good agreement with the calculated composition of the products after they had been expanded from 1000 to 14.7 psi. (U.S. Navy, 1989)

CALCULATED VERSUS DETERMINED HEATS OF EXPLOSION

The heats of explosion have been calculated from the composition products, expanding from 1000 to 14.7 psi, from PEP for numerous explosives and propellants. In general, there was good agreement between the experimental and calculated values using the PEP output data (Baroody 1987). The close agreement between the calculated and the determined values for both the combustion products and heats of explosion determined at the Naval Surface Warfare Center, White Oak, Md. (NSWC) laboratory is the basis for using the pressure values of 1000 and 14.7 psi. (U.S. Navy, 1989)

MATERIAL-TO-AIR RATIOS

The computer program calculates a series of material-to-air ratios from 100:0 to 10:90, in increments of 10:10. The emissions products are shown in the printouts for each of the ratios. For the purpose of the deactivation facility, the air-to-material ratio utilized in the design basis was based on the volume and velocity of air which the equipment can process and the use of sufficient excess air to assure complete combustion.

Emissions for all nine material-to-air ratios are given in the model. The ideal condition exists when the residual carbon and hydrogen form carbon dioxide and water. This ideal condition requires sufficient oxygen to be present. The conditions under which each specific waste will be deactivated will depend upon the weight of material processed, the capability of the equipment, and the ideal air-to-material ratio to assure complete combustion.

CALCULATING TEMPERATURE CHANGE

As discussed above, the temperature change is simulated by calculating the material burning at 1000 psi and allowing the combustion products to expand to 14.7 psi. These two pressure values were chosen based on experimental data determined at this laboratory. As mentioned, the theoretical combustion products and heats of explosion calculated under these conditions were in good agreement with the experimental calorimetric data for the gases formed and the heats of explosion determined. Since temperature is a function of both gases formed and heat released, the calculated temperature change between the pressures of 1000 and 14.7 psi is used for predicting pollution products.

The temperature calculated at 1000 psi simulates the initial high flame temperature of the material before it expands. This calculated temperature is slightly higher than the calculated flame temperature if ambient pressure were used instead. For example, the flame temperature for TNT is 1992 K at 1000 psi and 1976 K at 14.7 psi (with no expansion). With such close agreement at these two pressures, it was not felt necessary to program the computer to obtain an initial flame temperature at ambient pressure before calculating the temperature drop. This is especially true when the initial flame temperature is subject to the conditions of the environment. (U.S. Navy, 1989)

HOMOGENEITY OF MATERIALS

Often different types of materials are treated together. In such cases, all of the ingredients in the materials are combined and treated as one homogeneous material in the calculations.

LIMITATIONS

THERMODYNAMIC DATA FOR COMBUSTION PRODUCTS

The program contains an auxiliary data file (PEPAUX) for the combustion products. Heat capacity coefficients and enthalpy and entropy constants are stored for each of the combustion products. Most of the data in this file are from the JANNAF Thermochemical Tables (Stull and Prophet, 1971). Currently, there are over 1400 species in the file. It contains compounds in the gaseous, liquid, and solid states.

The program chooses the compounds to consider in the calculations from the elemental composition of the material burned. If the material contains the elements C, H, O, or N, the program searches the library for all species containing these elements and considers them as possible pollution products. The total number of combustion products considered for each calculation is listed in the output data. Obviously, any products formed at the OB/OD site and not in this file cannot appear in the calculations. This library contains most of the species that are formed from explosives and propellants used by the armed services. (U.S. Navy, 1989)

HIGH-TEMPERATURE SPECIES

Some of the species formed only exist at high temperatures. These species would disappear as ambient temperature is approached. For example, ions would be in this category. These species normally disappear in the calculations as more air is added. In evaluating the pollution products, these species are assumed to disappear. For most explosives and propellants, these species are only a small percentage of the total. (U.S. Navy, 1989)

COMBUSTION PRODUCTS PRINTED TWICE

The thermodynamic data cover a wide temperature range. In some species (notably solid carbon and aluminum oxide), the data are stored as two heat capacity equations to properly cover the temperature range. Therefore, some species appear twice in the output data. When this occurs, one or the other of the symbols representing that species is zero. This does not affect the results. (U.S. Navy, 1989)

TEMPERATURE AND OXYGEN

The program requires that a flame temperature of 300 K is reached in the treatment and that sufficient oxygen for combustion is available for combustion either from air or from material containing oxygen. All data presented here meet these conditions.

TREATMENT DATA

The Pollu-10 Model predications of temperature, gas generation volumes, and fume emission concentrations have been utilized in the design of the deactivation facility. The key parameters of concern are the material-to-air ratios, the total volume of gases produced at STP and the relative percentages of emission species produced per 100 grams of material treated. The deactivation treatment facility will run at material to tier treatment ratios the same as utilized in the Pollu-10 Model. The 60:40 material mass to air mass ratio will be most commonly used and, thus, the Model data for the 60:40 ratios are applicable to most emissions from the treatment plant. In some cases, other ratios are utilized.

The operating plan for the twelve bays in the deactivation facility is diagrammed in Table 8.

TABLE 8

PLANNED OPERATING SEQUENCE FOR DEACTIVATION FACILITY

Deactivation Plans   Deactivation Boxes   Deployment Devices
A 1–4                B 1–4                C 1–4
       ↓                    ↓                    ↓

Each bay operates twice per day for 60 minutes.

$$4 \text{ bays} \times \frac{2 \text{ operations}}{\text{day}} \times \frac{60 \text{ minutes}}{\text{operation}} = \frac{8 \text{ hours per day for each type of device}}{}$$

4 deactivation pans operate 8 hours per day
4 deactivation boxes operate 8 hours per day
4 deactivation devices operate 8 hours per day
12 bays operate 24 hours per day
Air Pollution Control System operates continuously

TIMING OF OPERATIONS

Each bay operates for approximately one hour per batch. Emissions from a batch of waste enters the expansion chamber 12 or the cyclone 96 and will pass through the air pollution control system 24 and out the stack 112 during this one-hour period. The design features which assure the one-hour per batch timing sequence are explained below.

DEACTIVATION PANS AND EXPANSION CHAMBER

All four pans are loaded with waste for treatment at the beginning of a shift. The air pollution control system is brought up to operating speed. Dampers and vents in three bays are closed off, while the first bay is initiated. The treatment will last from one to sixty minutes, with all fumes entering the Expansion Chamber. The air pollution control system fan pumps the result gas out during the remainder of the one hour period at a constant flow rate. At the end of one hour, a second bay is initiated. Some modification of this sequence may be required for unusual wastes.

DEACT BOXES AND CYCLONE

Deact boxes are designed to require one hour to adequately melt out and pop all of the material to be treated. A constant air flow rate is maintained during the one hour treatment period. The treatment rate is controlled by the electrical current supplied to the box. Upon completion of a treatment by deact box B-1, then deact box B-2 is initiated and operates for one hour. Air pollutant emissions move through the cyclone and scrubber at a steady state.

DEPLOYMENT DEVICES AND CYCLONE

The firing rate of devices is electronically controlled so that each loaded bay requires sixty minutes to complete an operations cycle. Each of the four bays fires sequentially, providing for a continuous emission rate for each bay of one hour. Deployment device emissions pass through the cyclone and scrubber at a constant flow rate during the treatment cycle.

During a typical week, the system will operate Monday through Saturday, 24 hours per day. One-third of this time is occupied by deactivation pans, one-third by deactivation boxes and one-third by deployment devices. Thus, each device will operate 48 hours out of a typical 144 hours of system operation per week. The fan, scrubber, and related pollution control equipment operate continuously during the six day period.

The operating time for each type of treatment device is an essential part of the emission calculations, which are addressed in the following sections. In cases where the operating time schedule is modified, the air emissions calculations can be modified accordingly.

WASTE CHARACTERISTICS

WASTES WHICH WILL BE DEACTIVATED AT THE FACILITY

A variety of waste from the military, the explosives manufacturing industry and the automobile air bag industry will be accepted for deactivation at the facility 10. The list of US EPA waste codes that will be accepted by the facility is presented in Table 9, Acceptable Waste Codes. The wastes include off-specification production materials, materials contaminated with reactive wastes, out-of-date products and other wastes described in detail in the following sections of this application. A total of 56 waste codes are listed, including solvents used for safety reasons for bulk waste packaging and the individual chemical components of the waste.

TABLE 9

WASTE CODES ACCEPTABLE FOR DEACTIVATION

| WASTE CODE | NAME OF WASTE |
|---|---|
| D001 | Ignitable Waste |
| D002 | Corrosive Waste |
| D003 | Reactive Slurries in Containers |
| D003 | Reactive Soil and Debris |
| D003 | Spent, Obsolete and Off-Specification Explosives in Containers |
| D005 | Barium Containing Waste |
| D006 | Cadmium Containing Waste |
| D007 | Chromium Containing Waste |
| D008 | Lead Containing Waste |
| D010 | Selenium Containing Waste |
| D011 | Silver Containing Waste |
| D018 | Benzene Containing Waste |
| D019 | Carbon Tetrachloride Containing Waste |
| D021 | Chlorobenzene Containing Waste |
| D022 | Chloroform Containing Waste |
| D023 | o-Cresol Containing Waste |
| D024 | m-Cresol Containing Waste |
| D025 | p-Cresol Containing Waste |
| D026 | Cresol Containing Waste |
| D027 | 1,4-Dichlorobenzene Containing Waste |
| D028 | 1,2-Dichloroethane Containing Waste |
| D029 | 1,1-Dichloroethylene Containing Waste |
| D030 | 2,4-Dinitrotoluene Containing Waste |
| D032 | Hexachlorobenzene Containing Waste |
| D033 | Hexachlorobutadiene Containing Waste |
| D034 | Hexachloroethane Containing Waste |
| D035 | Methyl ethyl ketone Containing Waste |
| D036 | Nitrobenzene Containing Waste |
| D037 | Pentachlorophenol Containing Waste |
| D039 | Tetrachloroethylene Containing Waste |
| D040 | Trichloroethylene Containing Waste |

TABLE 9-continued

WASTE CODES ACCEPTABLE FOR DEACTIVATION

| WASTE CODE | NAME OF WASTE |
|---|---|
| D041 | 2,4,5-Trichlorophenol Containing Waste |
| D042 | 2,4,6-Trichlorophenol Containing Waste |
| D043 | Vinyl Chloride Containing Waste |
| F002 | Spent halogenated solvents (see 40 CFR 261.31 for complete list) |
| F003 | Spent non-halogenated solvents (see 40 CFR 261.31 for complete list) |
| F004 | Spent non-halogenated solvents (see 40 CFR 261.31 for complete list) |
| F005 | Spent non-halogenated solvents (see 40 CFR 261.31 for complete list) |
| F021 | Waste from production or use of pentachlorophenol |
| K044 | Wastewater treatment sludges from the manufacturing and processing of explosives |
| K045 | Spent carbon from the treatment of wastewater containing explosives |
| K046 | Wastewater treatment sludges from manufacturing, formulation and loading of lead-based initiating compounds |
| K047 | Pink/red water from TNT operations |
| P009 | Ammonium Picrate (R) |
| P068 | Methyl Hydrazine |
| P081 | Nitroglycerine (R) |
| P105 | Sodium Azide |
| P112 | Tetranitromethane (R) |
| U105 | 2,4, Dinitrotoluene |
| U106 | 2,6, Dinitrotoluene |
| U133 | Hydrazine (R,T) |
| U186 | N,N' Diethylhydrazine |
| U098 | 1,1, Dimethylhydrazine |
| U099 | 1,2, Dimethylhydrazine |
| U109 | 1,2, Diphenylhydrazine |
| U171 | 2-Nitropropane (1,T) |

TOTAL 56 Waste Codes

EMISSION STANDARDS COMPLIANCE

The present deactivation facility includes a unique methodology to assure that all air emissions from the facility stack 112 always comply with Federal and State requirements for emissions of metals, chloride, particulates, organics and criteria pollutants.

The manner in which assurance is provide that air pollution standards are not exceeded is shown diagrammatically in Table 10. The approach utilized will calculate the emissions of metals, chlorine, particulates, organics, and criteria pollutants based on a theoretical 2000 pound batch of waste. Calculated emissions will be compared to allowable emissions from various Air Quality Standards. Anytime a potential exceedance is noted, the waste feed rate will be reduced until an acceptable emission rate is achieved. This will establish an acceptable batch feed rate for each waste prior to operation. Details are given in the following sections.

TABLE 10

METHODOLOGY FOR ESTABLISHING ALLOWABLE FEED RATE FOR EACH WASTE STREAM

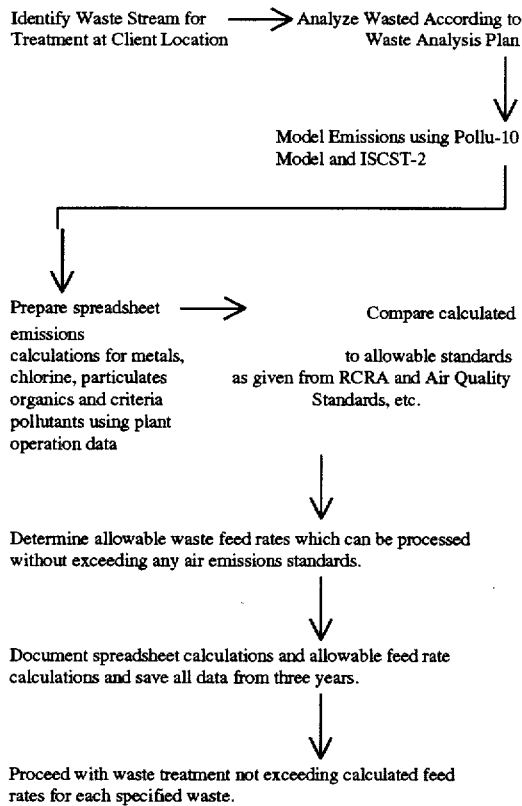

Emissions from deactivation pans A-1 to A-4, deactivation boxes B-1 to B-4, and deployment devices C-1 to C-4 are calculated independently on an hourly batch basis. In uncommon cases where the same pollutants are emitted by different devices during one day, then the increments contributed by each device will be added. All pollutants of all types will be summed to calculate annual emissions of each type of pollutant. The techniques for using spreadsheets to calculate compliance with applicable standards prior to treatment of the waste are flexible enough to account for variances in the treatment operations for variances in the treatment operations schedules, for overlap among pollutants emitted, and will account for the total annual emissions of each pollutant.

In yet another embodiment of the present invention, a reactive waste deactivation facility comprises a building 160 as shown diagrammatically in FIG. 7 and in cross-section in FIG. 8.

In this embodiment 160, a plurality of deactivation bays 162, for example six in number, define an outer perimeter 164 of the building 160 and are disposed around a plurality of expansion chambers 166, for example two in number. Both expansion chambers 166 are connected to a common air pollution control system 168, such as a single venturi scrubber as described above. A covered walkway 170 is provided which provides loading access for each deactivation bay 162.

As will be discussed hereinafter, the building 160 is designed to contain the heat and pressures of burning hazardous waste in one deactivation bay 162 at a time. Yet, the building 160 may be operated continuously, for example, for up to six consecutive days, enabling the constant processing of multiple loads of hazardous waste.

Although not shown in FIGS. 7 and 8 for the sake of clarity, each deactivation bay 162 includes means for deactivating hazardous waste as discussed hereinabove with regard to earlier described embodiments. For example, each deactivation bay 162 may be designed to contain either pans means for burning non-detonating materials, box means for melting and or deactivating manufactured items by electrical radiant heat, or deployment means for electrically initiating manufactured items.

One or more of the cells 180 may comprise a detonation chamber that is able to contain multiple detonations of up to ten pounds of TNT based on a twelve pound design load. For example, the detonation chamber may be approximately 14 feet in diameter and twenty four feet in length. The chamber may exhaust through a remotely controlled valve which controls gas flow rate, to a particulate filter system which may comprise a part of the air pollution control system.

A computer system 176, comparable to the computer system 18 discussed earlier, provided control means for sequencing of operation of the deactivation means in the plurality of bays 162. The computer system 176 is preferably housed in a separate building (not shown) and provides remote control of a number of processes which take place in building 160, as will be discussed hereinafter.

Each bay 162 may comprise either single or paired concrete cells 180. For purposes of example only, each cell 180 may be rated to contain approximately 500 pounds of explosive weight. More particularly, each cell 180 may comprise 28-inch thick concrete walls 182, roof 184 and floor slab 186 reinforced with #10's at eight inches on center. This concrete thickness and reinforcement will allow the cell 180 to remain within an elastic range without undergoing any permanent plastic deformation based on a design gas pressure of 36 psi. Furthermore, in the event of an uncontrolled, accidental explosion in a cell 180, the explosive incident will not propagate between adjacent cells 180.

Loading doors 192 are provided which are sufficiently large to enable introduction of multiple trays of hazardous waste (not shown) therein. The loading doors 192 are designed to close leak tight and are of sufficient thickness and reinforcement to contain pressures and heat generated during treatment. Each cell 180 and its loading door 192 may be insulated and lined with refractory material in order to contain heat and ejected fragments of debris during treatment.

The loading doors 192 are closed during the initial operation of the deactivation bay 162 until process conditions, which are determined by analysis of computer generated signals terminating in the control building, indicate that all energetic materials have been deactivated. The loading doors 192 are remotely operable, by means of the computer system 176, to vent cooling air and final combustion air into the bay 162.

The expansion chambers 166 provide means for controlling expansion of waste gasses generated during the deactivating of hazardous waste in the bays 162. As a specific example, each expansion chamber 166 may comprise a substantially cubical structure with exterior height, width and depth dimensions of about 50 feet. The interior height of the structure may be about 25 feet. These dimensions provides the necessary volume for expansion of waste gasses exhausted from one of the deactivation bays 162.

The exterior walls, or sidewalls 208, may be comprised of concrete. In this particular example, the sidewalls 208 and roof 210 of the expansion chambers 166 will be approximately 48 inches thick with #10's at 8 inches on center.

Each expansion chamber 166 preferably includes two interior walls 212 which bisect each other, as shown in FIG.

7. The interior walls 212 are disposed such that abut the sidewalls 208 and roof 210 and provide structural support therefor. Access passages 214 between the sidewalls 208 and interior walls 212 are provided for enabling periodic inspection and cleaning of the expansion chamber 166.

The interior walls 212 include means, defining perforations or openings 222 therein, for promoting a uniform pressure buildup throughout the expansion chamber 166 during deactivation in one of the bays 162. Such openings 222 are shown in FIG. 8, and importantly, function to direct a flow of waste gasses through the interior walls 212 in order to rapidly disperse the waste gasses and equalize pressure throughout the chamber 166.

The building 160 includes a plurality of expansion ducts 226. Each duct 226 passes between one of the deactivation bays 162 and one of the expansion chamber sidewalls 208 as shown most clearly in FIG. 7. The expansion ducts 226 provide means for exhausting the waste gasses from the deactivation bays 162 into the expansion chamber 166.

As a specific example, each expansion duct 226 may be comprised either a cylindrical, or rectangular concrete structure approximately 55 feet long with 12 inch thick walls 228 with an interior cross section of about ten feet in diameter.

The expansion ducts 226 preferably include means for controlling pressure of hot waste gasses exhausted therethrough. For example, liquid spray nozzles 232 may be disposed within the ducts 226 and oriented such that full spray coverage of a cross section of the duct 226 is achieved.

The liquid spray may comprise, for example, cool water. Naturally, the cool spray functions to reduce pressure of the exhausted waste gas stream as it travels through the duct 226, which reduces pressure in the overall system. The spray nozzles 232 are remotely controlled by means of the computer system 176.

In order to facilitate collection of spent spray water, floors of the ducts and expansion chambers may be sloped to one or more specific locations 234 in the expansion chambers 166, where a sump or drain is disposed. The spent spray water may then be cycled to the scrubber of the air pollution control system for cleaning.

As the expansion chamber 166 is preferably designed to contain expansion gasses exhausted from only one of the bays 162 at a time, means are provided for selectively isolating each other deactivation bay 162 from the expansion chamber 166 during the deactivation in the operating bay 162.

Preferably, the means for isolating comprises closable exhaust ports 230 disposed between each of the plurality of deactivation bays 162 and expansion ducts. The exhaust ports are controlled remotely by means of the computer system 176.

Each exhaust port 230 may be opened a degree based on an anticipated amount of explosives to be treated in the bay 162 such that when the port 230 is opened to such a degree, gasses will pass into the expansion chamber 166 at a rate to prevent pressures from exceeding the design capacity of the bay 162. Each closable exhaust port 230 may be provided in order to isolate each treatment chamber from the expansion chamber. The exhaust ports will be powered and operated remotely, the exhaust port size is based on the amount of explosive to be treated.

Additional ports (not shown) may be provided such that thermal scanners, video cameras and lights may be inserted into the deactivation bays 162 remotely for inspection prior to opening of bay loading doors 192 for reloading.

Pressure and temperature transducers (not shown) may be provided to record pressures in the deactivation bays during the hazardous waste treatment. The signals therefrom may terminate in the control room housing the computer system 176. For safety reasons, interlocks on all doors, such as loading doors 192, of the building 160 may interface with the computer control system 176 to assure that the doors are in proper position at all times.

As a specific example, the following instruments and devices located in the deactivation bays 162 and expansion chambers 166 may be controlled from a main control panel in the control room housing the computer system 176:

1) Limit switches on the deactivation bay loading doors 192 to confirm door position;
2) Air and hydraulic door closer on interior doors (i.e. closable exhaust ports 230) with redundant limit switches to confirm door position;
3) Control valve for heating and cooling cells 180 in each bay 162;
4) Temperature sensors at the exit ports of each deactivation bay, expansion chamber and air pollution control system;
5) Pressure sensors for the deactivation bays, expansion chambers and air pollution control system;
6) Infrared thermal scanners for the deactivation bays;
7) Damper actuators to control air flow for ventilation and air pollution control system;
8) Actuators to control fresh air vents which are opened when the process is completed;
9) Solenoids to control water spray for the expansion ducts;
10) Start-stop operation of pollution abatement and waste water systems which contain local controls;
11) Alarm contacts for pollution abatement and waste water systems;
12) Warning lights and audible alarms in each deactivation chamber and the expansion chambers; and
13) Closed circuit television with cameras in the deactivation bays and expansion chambers.

The air pollution control system 168, common to both expansion chambers 166, may comprise a single venturi scrubber for treating all waste gasses and liquids resulting from treatment of the energetics in the plurality of bays 162. A valving station (not shown) will isolate the scrubber from either or both of the expansion chambers 166. The scrubber may be operated continuously. Preferably, a natural gas afterburner will provide final treatment to the air just prior to discharge.

Scrubber water may be piped through a settling tank, filtered, and recycled through the system. Make-up water may be provided to the scrubber, as well as strip heating for freeze protection. Solid waste from the scrubber will be periodically removed from the settling tank.

Shown in phantom line in FIG. 7 are optional calciner 238 locations. A calciner 238 may operate in the temperature range of about 1,100 degrees F. and provide dwell time to Demil energetic components. The term Demil is used herein to denote the term demilitarization, which is used for a process which removes the military capability of an item. Accordingly, Deactivation or Destruction of any munition is considered to be a Demil activity. External gas fired heaters may provide heat to the calciner 238. It may be scaled to process one component every three minutes with up to 0.15 lb TNT equivalent or as many as 3 components with 0.002 lb TNT equivalent per minute. Other materials and components will require individual evaluation of throughput rate which may be higher or lower.

Although not shown, it should be appreciated by those skilled in the art that the calciner system may comprise a component loading station, a conveyor to transport the components to be processed through a protective barricade, a feed system, heated chamber, metal parts discharge system, structural barricades electrical utilities systems, and control systems.

Although there has been hereinabove described a deactivation facility and method in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A reactive waste deactivation facility comprising:

a plurality of deactivation bays, each comprising means for deactivating wastes listed by the United States Enviromental Protective Agency under EPA Waste Code D003, the plurality of deactivation bays defining an outer perimeter of the facility;

an expansion chamber including interior wall means for controlling expansion of waste gasses generated during the deactivating of hazardous waste, said expansion chamber disposed generally central to the plurality of deactivation bays, said interior wall means including means, defining openings therethrough, for dispersing waste gasses and promoting uniform pressure buildup of waste gasses throughout the expansion chamber;

expansion duct means, defined by a plurality of ducts connecting each deactivation chamber with the generally centrally disposed expansion chamber for exhausting the waste gasses from the deactivation bays into the expansion chamber;

air pollution control means, connected to said expansion chamber, for treating the waste gasses resulting from the deactivation of the hazardous waste;

means for venting waste gasses into the expansion chamber from one of the bays in which deactivation is being conducted;

means for selectively isolating each deactivation bay, in which deactivation is not being conducted, from the expansion chamber;

computer means for calculating a feed stream rate which will generate a selected output of waste gasses from the plurality of deactivation bays to the expansion chamber means and air pollution control means; and control means for sequencing of operation of the deactivation means in the plurality of bays and for controlling said means in the plurality of bays and for controlling said means for selectively isolating and said means for venting, to effect continuous processing of hazardous wastes in order to provide the selected output of waste gasses to said expansion chamber means and air pollution control means.

2. The facility according to claim 1 wherein said means for selectively isolating and said means for venting comprise closable exhaust ports, disposed between each of the plurality of deactivation bays and the expansion duct means and controllable by said control means.

3. The reactive waste deactivation facility according to claim 1 wherein the expansion duct means includes liquid spray mans for cooling and for controlling pressure of gasses exhausted therethrough and the deactivation facility further comprises sump means, disposed in said expansion chamber, for cycling spent liquid spray to the air pollution control means.

4. The reactive waste deactivation facility according to claim 1 wherein the wastes are selected from a group consisting of explosive contaminated trash, detonators, gas generants, ammunition, tear gas, pyrotechnics, propellants, air bag inflator devices, sigma tubes, emulsions, oxidizers, dynamite, boosters, squibs, grenades, explosive bolts, fuses, igniters, pharmaceuticals, blasting caps, signals, flares, explosive powders, gunpowders, incendiary devices, detonation cord, and explosive sludges.

5. A reactive waste deactivation facility comprising:

at least six deactivation bays, including means for deactivating wastes listed by the United States Environmental Protective Agency under EPA Waste Code D003, said deactivation bays defining an outer perimeter of the facility;

two expansion chambers, each including bisecting interior wall means for controlling expansion of waste gasses generated during the deactivation of reactive waste in one of the bays, said bisecting interior wall means including means, defined by a plurality of openings therein, for dispersing waste gasses and promoting a uniform pressure buildup in the expansion chamber, said two expansion chambers being disposed generally central to the deactivation bays;

expansion duct means, comprising at least six generally cylindrical ducts, for exhausting the waste gasses from the deactivation bays into the expansion chambers, at least two of said ducts being connected to each of the generally centrally disposed expansion chambers, the expansion duct means including liquid spray means for cooling waste gasses exhausted therethrough, and closable exhaust port means for both venting waste gasses into one of the expansion chambers from one of the deactivation bays in which deactivation is being conducted and for selectively isolating each deactivation bay, in which deactivation is not being conducted, from the expansion chambers during the deactivation in the one of the bays;

air pollution control means, comprising a single venturi scrubber connected to both of the expansion chambers for receiving and treating the waste gasses;

means for cycling spent liquid spray to the venturi scrubber for cleaning of the spent liquid spray;

computer means for calculating a feed stream rate which will generate a selected output of waste gasses from the plurality of deactivation bays to the expansion chamber and air pollution control means; and control means for sequencing of operation of the deactivation means in the plurality of bays, and for controlling said means for venting said means for selectively isolating, and for controlling the liquid spray means, to effect continuous processing of hazardous waste in order to provide the selected output of emission gasses to said expansion chamber and air pollution control means.

6. The reactive waste deactivation facility according to claim 5 wherein the wastes are selected from a group consisting of explosive contaminated trash, detonators, gas generants, ammunition, tear gas, pyrotechnics, propellants, air bag inflator devices, sigma tubes, emulsions, oxidizers, dynamite, boosters, squibs, grenades, explosive bolts, fuses, igniters, pharmaceuticals, blasting caps, signals, flares, explosive powders, gunpowders, incendiary devices, detonation cord, and explosive sludges.

* * * * *